US008650640B2

(12) United States Patent
Calcaterra et al.

(10) Patent No.: US 8,650,640 B2

(45) Date of Patent: Feb. 11, 2014

(54) USING A DECLARATION OF SECURITY REQUIREMENTS TO DETERMINE WHETHER TO PERMIT APPLICATION OPERATIONS

(75) Inventors: Jeffrey A. Calcaterra, Chapel Hill, NC (US); John R. Hind, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 129 days.

(21) Appl. No.: 13/034,646

(22) Filed: Feb. 24, 2011

(65) Prior Publication Data

US 2012/0222115 A1 Aug. 30, 2012

(51) Int. Cl.

| | |
|---|---|
| ***G06F 11/00*** | (2006.01) |
| ***G06F 12/14*** | (2006.01) |
| ***G06F 12/16*** | (2006.01) |
| *G06F 7/04* | (2006.01) |
| *G06F 17/30* | (2006.01) |
| *G06F 9/46* | (2006.01) |

(52) U.S. Cl.

USPC .......... 726/23

(58) Field of Classification Search

USPC .......... 718/104, 100; 726/1, 2, 14, 17, 22, 23, 726/27; 713/154, 164, 167, 182

See application file for complete search history.

(56) References Cited

U.S. PATENT DOCUMENTS

| | | | | |
|---|---|---|---|---|
| 6,412,070 | B1 * | 6/2002 | Van Dyke et al. | 726/17 |
| 6,505,300 | B2 * | 1/2003 | Chan et al. | 713/164 |
| 7,386,885 | B1 * | 6/2008 | Kaspersky et al. | 726/22 |
| 7,730,535 | B1 * | 6/2010 | Kaspersky et al. | 726/22 |
| 7,793,346 | B1 * | 9/2010 | Daub | 726/22 |
| 7,865,934 | B2 * | 1/2011 | Wobber et al. | 726/2 |
| 7,890,756 | B2 * | 2/2011 | Zlotnick | 713/167 |
| 7,926,086 | B1 * | 4/2011 | Violleau et al. | 726/1 |
| 7,930,539 | B2 * | 4/2011 | Soltis et al. | 713/167 |

(Continued)

OTHER PUBLICATIONS

Wikipedia "Antivirus Software" (online), (retrieved on Feb. 1, 2011) retrieved from the internet at URL://http://en.wikipedia.org/w/index.php?title=antivirus_software&printable=yes.html, 10 pgs.

(Continued)

*Primary Examiner* — Edan Orgad

*Assistant Examiner* — Kari Schmidt

(74) *Attorney, Agent, or Firm* — David W. Victor; Konrad, Raynes, Davda & Victor LLP

(57) ABSTRACT

Provided are a computer program product, system, and method for using a declaration of security requirements to determine whether to permit application operations. A declaration of security requirements indicates actions the application designates to perform with respect to resources in a computer system, wherein a plurality of the indicated actions are indicated for at least two operation modes of the application. A detection is made of whether the application is requesting to perform a requested action with respect to a requested resource in the computer system. A determination is made of a current operation mode of the application comprising one of the at least two operation modes in response to detecting that the application is requesting the requested action. A determination is made as to whether the declaration of security requirements indicates the requested action with the current operation mode. The requested action with respect to the requested resource is allowed to proceed in response to determining that the declaration of security requirements indicates the requested action with respect to the requested resource as indicated with the current operation mode.

18 Claims, 9 Drawing Sheets

2
Computer System
Processor 4
Memory 6
Security Program 20
Installation Routine 22
Application 12
Application Installation Programs 24
Declaration of Security Requirements 26
Operating System 8
Registry File 10
File System 14
Application Mode Permissions 28
Ports 16
Network 18
30
Application Distributor Computer
Installation Package 32
Installation Routine 22
Declaration of Security Requirements 26
Application Installation Programs 24
Update Package 34
Update Routine 36
Updated Declaration of Security Requirements 40
Update Installation Programs 38

(56) References Cited

U.S. PATENT DOCUMENTS

| | | | | |
|---|---|---|---|---|
| 8,281,410 | B1 * | 10/2012 | Sobel et al. | 726/27 |
| 2004/0199763 | A1 * | 10/2004 | Freund | 713/154 |
| 2005/0091214 | A1 * | 4/2005 | Probert et al. | 707/9 |
| 2005/0091655 | A1 * | 4/2005 | Probert et al. | 718/100 |
| 2005/0149726 | A1 | 7/2005 | Joshi et al. | |
| 2006/0031672 | A1 * | 2/2006 | Soltis et al. | 713/164 |
| 2006/0031679 | A1 * | 2/2006 | Soltis et al. | 713/182 |
| 2006/0156380 | A1 | 7/2006 | Gladstone et al. | |
| 2006/0161582 | A1 * | 7/2006 | Aghajanyan | 707/103 R |
| 2007/0038765 | A1 | 2/2007 | Dunn | |
| 2007/0199068 | A1 | 8/2007 | Russinovich et al. | |
| 2007/0220507 | A1 | 9/2007 | Back et al. | |
| 2007/0234359 | A1 * | 10/2007 | Bernabeu-Auban et al. | 718/100 |
| 2007/0294530 | A1 * | 12/2007 | Zlotnick | 713/167 |
| 2008/0040797 | A1 | 2/2008 | Schwartz et al. | |
| 2008/0115071 | A1 | 5/2008 | Fair | |
| 2008/0155245 | A1 | 6/2008 | Lipscombe et al. | |
| 2008/0163242 | A1 * | 7/2008 | Furuichi et al. | 719/310 |
| 2009/0183184 | A1 * | 7/2009 | Nadalin et al. | 719/328 |
| 2010/0081417 | A1 | 4/2010 | Hickie | |
| 2010/0235443 | A1 | 9/2010 | Laiho et al. | |
| 2012/0209923 | A1 * | 8/2012 | Mathur et al. | 709/206 |
| 2012/0222115 | A1 | 8/2012 | Calcaterra et al. | |

OTHER PUBLICATIONS

M. Murray, "Free Back to School Software" (online) Aug. 5, 2009 (retrieved on Janurary 19, 2011), retrieved from the internet at URL:// http:www.pcmag.com/print/article2/ 0,1217,a=221911,00asp?hidPrint=true.html, 20 pgs.

"Comodo Internet Security User Guide Version 4.0", (online), 2010, retrieved from the internet at URL http:www.comodo.com, 328 pgs.

"Comodo Internet Security 2011 User Guide Version 5.3", (online), 2011, retrieved from the internet at URL http:www.comodo.com, 286 pgs.

"The Six Dumbest Ideas in Computer Security" (online), Sep. 1, 2005, (retrieved on Dec. 9, 2010) retrieved from the Internet at URL http://www.ranum.com/security/computer_security/editorials/ dumb/html, 9 pgs.

US Application entitled "Providing a Declaration of Security Requirements to a Security Program to Use to Control Application Operations" , invented by Jeffry A. Calcaterra and John R. Hind.

P. Mell, "THe NIST Definition of Cloud Computing (Draft)", National Institute of Standards and Technology, Special Publication 800-145 (draft), Jan. 2011, pp. 1-7.

Office Action dated Oct. 19, 2012, pp. 1-35, for U.S. Appl. No. 13/034,647, filed Feb. 24, 2011, by Jeffrey Calcaterra et al.

Response to Office Action dated Jan. 23, 2013, pp. 1-17, for U.S. Appl. No. 13/034,647, filed Feb. 24, 2011, by Jeffrey Calcaterra et al.

Final Office Action dated Feb. 14, 2013, pp. 1-34, for U.S. Appl. No. 13/034,647, filed Feb. 24, 2011, by Jeffrey Calcaterra et al.

Response to Final Office Action dated May 14, 2013, pp. 1-17, for U.S. Appl. No. 13/034,647, filed Feb. 24, 2011, by Jeffrey Calcaterra et al.

Wikipedia, "User Account Control", (online) retrieved fromt he Internet on Jun. 5, 2013 from URL> http://en.wikipedia.org/w/index.php?title=Use_Account_Control&oldid=386700350(Jun. 5, 2013 6:11:42 PM), pp. 1-7.

Office Action, dated Jun. 26, 2013, for U.S. Appl. No. 13/034,647, filed Feb. 24, 2011 entitled "Providing a Declaration of Security Requirements to a Security Program to Use to Control Application Operations", invented by Jeffrey A. Calcaterra et al., pp. 1-34.

* cited by examiner

USING A DECLARATION OF SECURITY REQUIREMENTS TO DETERMINE WHETHER TO PERMIT APPLICATION OPERATIONS

BACKGROUND OF THE INVENTION

1. Field of the Invention

The present invention relates to a computer program product, system, and method for using a declaration of security requirements to determine whether to permit application operations.

2. Description of the Related Art

Security software programs, such as anti-virus and firewall programs, are designed to detect and prevent the execution of malicious software (malware), including viruses, and access by unauthorized users, such as hackers. One type of anti-virus program searches for known patterns of data within executable code that matches code or a slight variation of code included in a signature file including known malicious code. The anti-virus program determines whether subject code being inspected matches or is a slight variation of malicious code included in the signature file. Anti-virus programs employing this signature-based approach may not be able to identify new viruses not indicated in the signature file. Another type of antivirus software determines whether the actions and behavior of code indicates malicious behavior as indicated in a behavior signature file. The behavior monitoring approach may not detect new patterns of behavior by more recent viruses and legitimate software may exhibit the same behavior as malware, such as downloading and uploading files, reading the registry accessing system paths, etc. Further, behavior based approaches may only detect the malevolent software after the actions have been performed.

Security programs that monitor application behavior, such as attempts to write to or access the registry file, specific ports may block activity and then query the user through a graphical user interface (GUI) to indicate whether a requested action by an application is authorized. This user query approach depends on the computer knowledge of the user. Many computer users lack the knowledge to provide an informed decision on whether to allow actions to proceed, and the impact of their decision on the computer security and application performance.

There is a need in the art for improved techniques for detecting and stopping malicious code and unauthorized users from accessing computer resources.

SUMMARY

Provided are a computer program product, system, and method for using a declaration of security requirements to determine whether to permit application operations. A declaration of security requirements indicates actions the application designates to perform with respect to resources in a computer system, wherein a plurality of the indicated actions are indicated for at least two operation modes of the application. A detection is made of whether the application is requesting to perform a requested action with respect to a requested resource in the computer system. A determination is made of a current operation mode of the application comprising one of the at least two operation modes in response to detecting that the application is requesting the requested action. A determination is made as to whether the declaration of security requirements indicates the requested action with the current operation mode. The requested action with respect to the requested resource is allowed to proceed in response to determining that the declaration of security requirements indicates the requested action with respect to the requested resource as indicated with the current operation mode.

DETAILED DESCRIPTION

Described embodiments provide techniques for an application program to provide to a security program a declaration of security requirements that the security program uses during application execution to determine which application actions to permit, where the permitted actions with respect to certain computer resources comprise those actions designated in the declaration. The application may provide the declaration of security requirements as part of an installation, application update or at other points during application execution. Further, the declaration of security requirements may specify different actions permitted to the application and its components at different lifecycle stages of the application, such as installation, normal operations, and updates.

Figure 1:
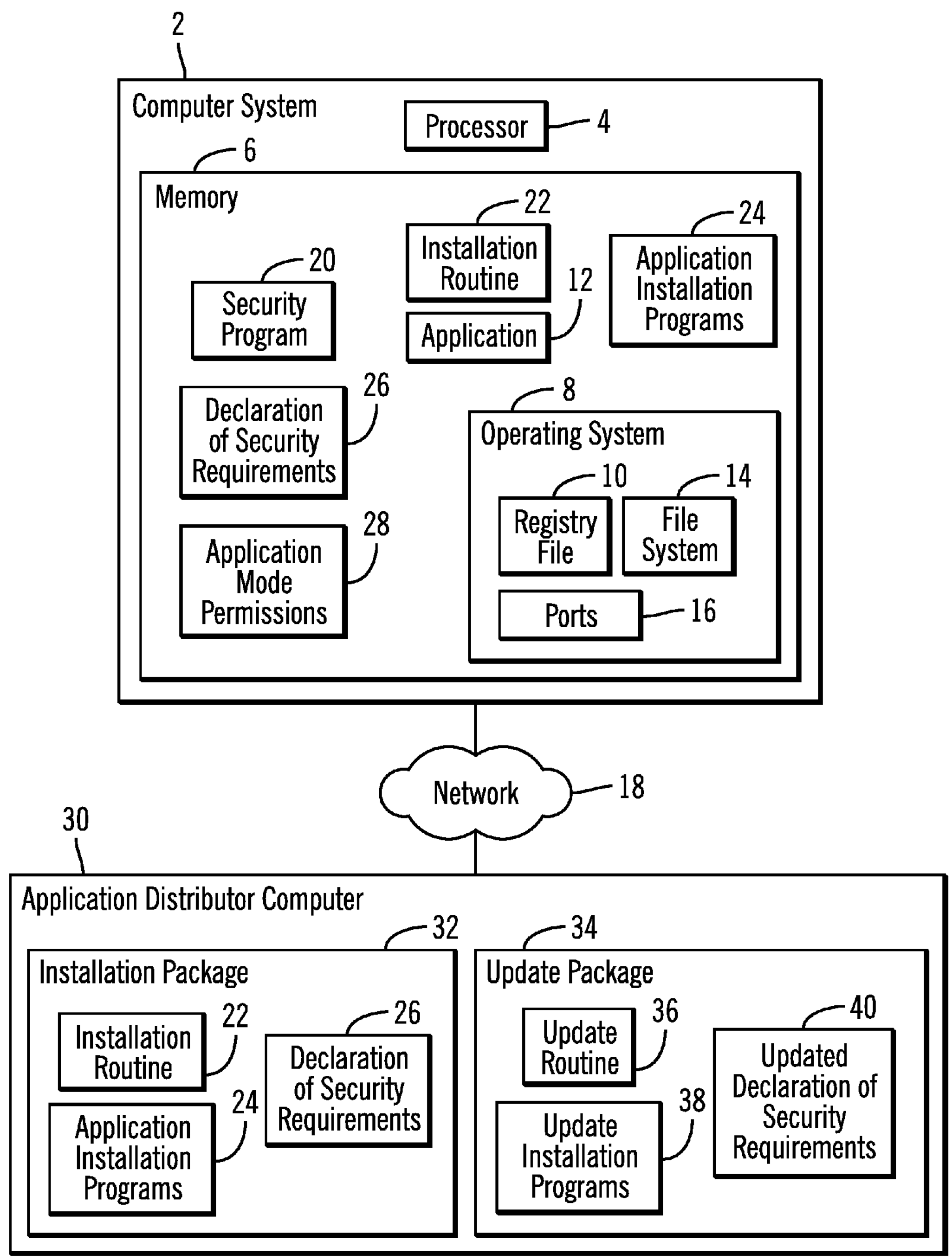
FIG. 1 illustrates an embodiment of a computing environment.

FIG. 1 illustrates an embodiment of a computing environment. The environment includes a computer system 2 having a processor 4 and a memory 6 including various program components executed by the processor 4, including data structures. The memory 6 includes an operating system 8 having a registry file 10 in which parameters, values and other information used by installed applications 12 are registered, a file system 14, and software ports 16. The ports 16 comprise an application-specific or process-specific software construct serving as a communications endpoint that provide a virtual/logical data connection that can be used by programs to exchange data directly within the computer system 2 or over the network 18, instead of going through a file or other temporary storage location, such as Transmission Control Protocol (TCP) and User Datagram Protocol (UDP) ports.

The memory 6 further includes a security program 20, which comprises a computer program that provides firewall, antivirus, and other protection against malware and intruders by monitoring the operations of installed applications 12 and determining whether to allow their actions to proceed. The security program 20 is designed to block unauthorized access while permitting authorized communications or application program actions based upon a set of rules and other criteria. Although the security program 20 is shown in FIG. 1 as implemented in software executed by the processor 4, in alternative embodiments, the security program 20 may be implemented in a hardware device placed between the computer system 2 and the network 18, or within an expansion card within the computer system 2. In a yet further embodiment, the security program 20 may be implemented in a server or computer system external to the computer system 2 that monitors activity at the computer system 2.

When an application 12 is installed, the application developer provides an installation package 32 including an installation routine 22, application installation programs 24, and a declaration of security requirements 26. The installation routine 22, which may be in the form of an installation wizard, is invoked by the user to install the application installation programs 24 in the computer system 2 to provide the installed application 12. The installation routine 22 provides to the security program 20 a declaration of security requirements 26 which provides a set of actions and/or resources the application 12 will access at different life cycles of the application 12, such as during an installation mode, normal operation mode, and update mode. The security program 20 uses the declaration of security requirements 26 to determine whether to allow specific application 12 attempts to perform actions and access resources during different operation modes based on what is permitted in the declaration 26 and whether to allow the application to switch between different modes of operation. The security program 20 maintains application mode permissions 28 indicating which types of actions/resources the application 12 may access based on the operation mode in which the application 12 is running, such as installation mode, normal operations mode, and update mode.

At certain instances, not all the programs may be present in memory 6. For instance, the installation routine 22 and application installation programs 24 may be maintained in memory 6 during installation, but removed thereafter, and the update routine 36 may be maintained in memory 6 during the update following the installation, but then removed after the update completes. Thus, different components of the application 12 may be maintained in the memory 6 during different life cycle stages of the application 12. Further programs and their components may be swapped between the memory 6 and a storage device coupled to the computer 2.

Although only one application 12 and declaration of security requirements 26 are shown, there may be multiple applications 12 installed on the computer system 2, through application 12 specific installation routines 22 and application installation programs 24, and for multiple of the installed applications 12 a declaration of security requirements 26 specifically designed for the application specific operations.

The application distributor computer 30 is a computer operated on behalf of the application developer to distribute programs related to the application 12. The application distributor computer 30 maintains information and programs for the application 12 installed on the computer system 2, such as an installation package 32 providing program components to install the application 12 and an update package 34 providing programs components to update an already installed application 12. The installation package 32 may include the above discussed installation routine 22, application installation programs 24, and declaration of security requirements 26 used to provide a full installation of the application 12. The update package 34 provides an update routine 36 to update an already installed application 12 with update installation programs 38 and to optionally update or replace the updated declaration of security requirements 40 to update the actions/resources permitted to the application 12 based on the program updates that may change the actions/resources the application 12 is designed to access in the computer system 2. The update routine 36, update installation programs 38, and updated declaration 40 may be loaded into the memory 6 of the computer system 2 in the same manner as the installation related items 22, 24, and 26.

In certain embodiments, the installation package 32 and update package 34 may be distributed to the computer system 2 over the network 18. In a further embodiment, the installation 32 and update 34 packages may be record on a portable storage media, such as a CD ROM, DVD, USB flash drive, etc., to provide to the user of the computer system 2 to load into the computer system 2.

Figure 2:
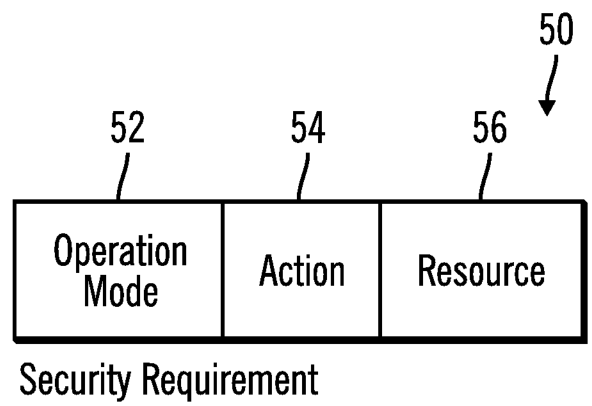
FIG. 2 illustrates an embodiment of an instance of a security requirement in a declaration of security requirements.

FIG. 2 illustrates an embodiment of a declaration instance 50 in the declaration of security requirements 26 information, which indicates an operation mode 52 to which the declaration applies, e.g., installation mode, normal operations mode, update mode, an action 54 that is permitted, such as write, read, transfer, execute, and a resource 56 that is the object of the action, such as a file in the file system 14, entry in the registry 10, communication on a port 16, program, call, data structure (e.g., dynamic library component, etc.). For instance, the declarations 26 may specify read/write operations to specific registry file 14 entries or the registry file 14 as a whole, processes that can access ports 16, files or directories in the file system 14, network addresses (e.g., Internet Protocol (IP) or Universal Resource Locator (URL) addresses), ports 16 or domains that can be accessed by a process, and applications that can be called.

The declaration instance 50 may specify both an action 52 and the object of that action 54. Alternatively, the instance 50 may specify only one of an action 52 or resource 54. If both an action 52 and resource are specified 54, then the application 12 is only permitted to perform that action 52 with respect to that resource 54. If only the action 52 is specified in the instance 50, then the application 12 may invoke that action 52 with respect to any resource. If only the resource 54 is specified, then the application 12 may invoke any action with respect to that resource 54. Further, the entry 50 in the declaration 26 may specify an action to be permitted and an action to be blocked. The instance 50 may specify that an action 54 and/or resource 56 as associated with one or more operation modes 52, to only allow the action 54 and/or resource 56 pair to be performed during the associated at least one operation mode. Alternatively, the instance 50 may not specify an operation mode 52 to indicate the action 52 and/or resource 54 pair may be performed during any operation mode. Further, the declaration instance 50 may further indicate whether to allow the application 12 to switch between different operation modes 52. If the application 12 is not permitted to automatically switch, then the security program 20 may request approval from the computer user to allow the application to change the operation mode.

Figure 3:
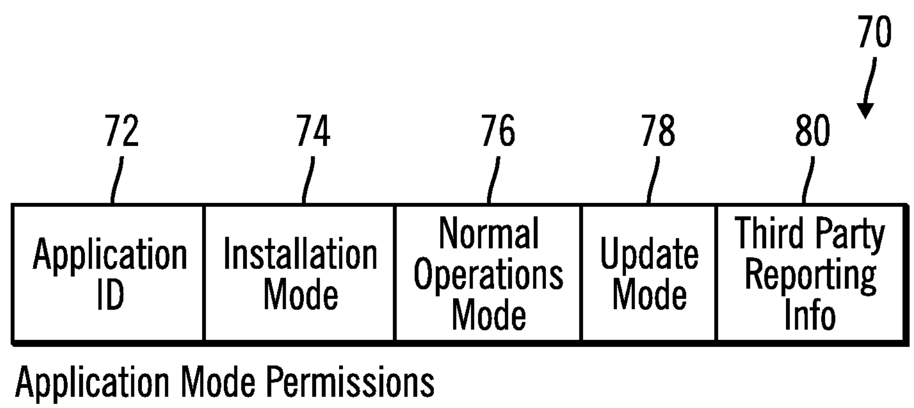
FIG. 3 illustrates an embodiment of application mode permissions.

FIG. 3 illustrates an embodiment of an instance 70 of the application mode permissions 28, which indicates an application identifier (ID) 72 of the application 12 to which the permissions applies, and an indication of which operation modes 72, 74, 76 of the application 72 are enabled or disabled, such as installation mode 72, normal operations mode 74, and update mode 76. The permissions 70 identify in which mode the application is permitted to operate, so that the application 12 is only permitted the actions 52/resources 54 identified in the declaration of security requirements 26 that are associated with the one or more modes 72, 74, 76 that are enabled for the application 12. For instance, if only installation mode 72 is enabled because the application 12 is being installed, then only those actions 52/resources 54 identified in the declaration of security requirements 26 as associated with the installation mode are permitted, and not actions/resources indicated for other modes, such as normal operation 74 and update 76 modes. In further embodiments, there may be additional modes of operations, including user configurable modes. Third party reporting information 80 indicates whether the user wants to log the results of the security program 20 monitoring of application 12 operations and contact information on where to forward the logged results, such as an email address, text address, etc.

Figure 4:
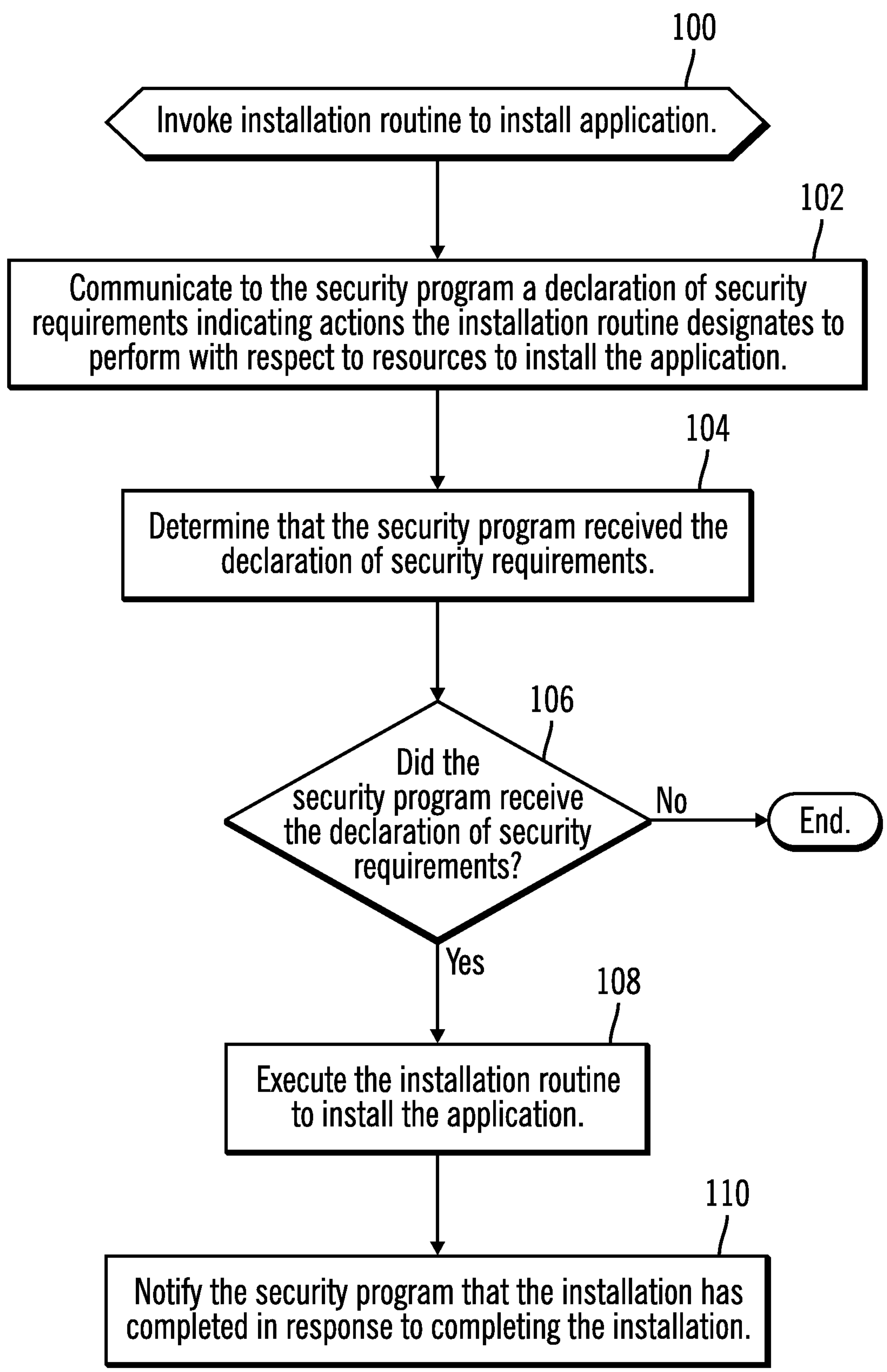
FIG. 4 illustrates an embodiment of operations to install an application.

FIG. 4 illustrates an embodiment of operations performed by the installation routine 22 to install the application 12. Upon being invoked (at block 100), the installation routine 22 communicates (at block 102) to the security program 20 a declaration of security requirements 26 indicating actions 54 the installation routine 22 designates to perform with respect to resources 56 to install the application 12. The installation routine 22 determines (at block 104) whether the security program 20 received the declaration of security requirements 26. This determination may be made by receiving a notification or acknowledgment form the security program 20 that the declaration 26 was received or by the installation routine 22 querying the security program 20 whether the declaration 26 was received. If (at block 106) the security program 20 does not receive the declaration 26, then control ends. Once the declaration 20 is received, then the installation routine 22 is executed to install the application 12. The installation routine 22 notifies (at block 110) the security program 20 that the installation has completed in response to completing the installation of the application 12 by installing all the application installation programs 24.

Although FIG. 4 shows the application 12 providing the declaration of security requirements 26 during installation or update, the application 12 may provide the declaration at different stages during program execution for the security program 20 to use to monitor and determine whether to allow application 12 actions to proceed. For instance, the application 12 may communicate the declaration of security requirements 26 indicating application actions designated to be performed with respect to resources in the computer system and then perform application operations in response to communicating the declaration of security requirements 26 to the security program 20. The application 12 may then perform, during the execution of the applications, the actions with respect to the resources at the computer system indicated in the declaration of security requirements 26.

Figure 5:
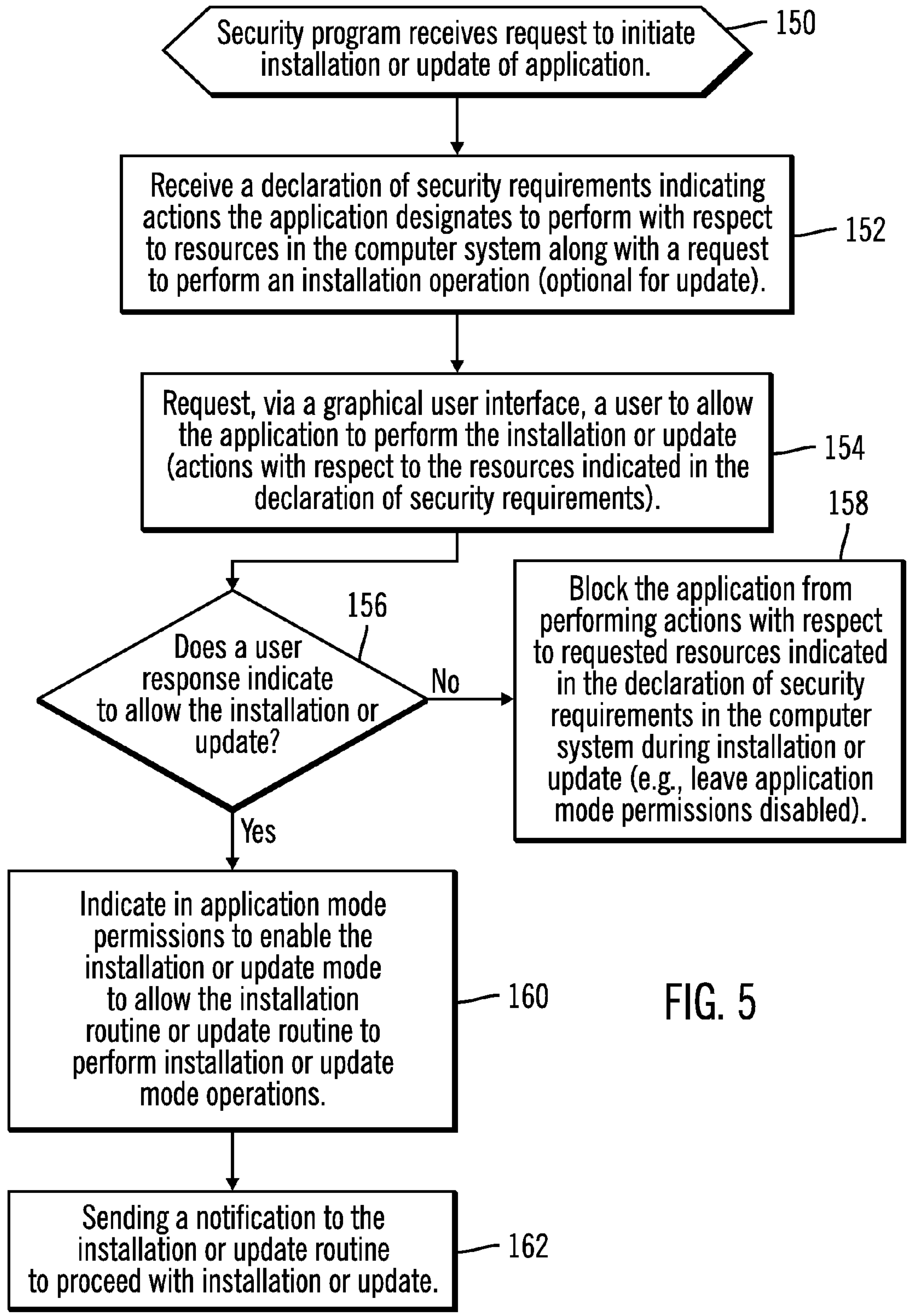
FIG. 5 illustrates an embodiment of operations to process a request to install or update an application.

FIG. 5 illustrates an embodiment of operations performed by the security program 20 to monitor the installation or update of the application 12. In response to receiving (at block 150) a request to initiate an installation or update of an application by an installation routine 22 or update routine 36, the security program 20 receives (at block 152) the declaration of security requirements 26, 40 indicating actions 54 and/or resources 56 the application designates to perform with respect to resources in the computer system. The declaration 26, 40 may be provided with the installation or update request or after the request is sent. The security program 20 generates (at block 154) in a graphical user interface (GUI), a request to the user to indicate whether to allow the application 12 to perform the installation or update. If (at block 156) the user declines to allow the installation or update, then security program 20 blocks (at block 158) the installation 22 or update 36 routine from performing actions with respect to requested resources indicated in the declaration of security requirements 26, 40 in the computer system 2 during installation or update. The security program 20 would further leave application mode permissions 70 for the application 12 disabled. If (at block 156) the user does indicate to allow the installation or update, the security program 20 indicates (at block 160) in the application mode permissions 70 for the application to enable the installation 74 or update 76 mode to allow the installation routine 22 or update routine 36 to perform installation or update mode operations. The security program 20 sends (at block 162) the installation 22 or update 36 routine a notification to proceed with the installation or update of the application 12.

Figure 6:
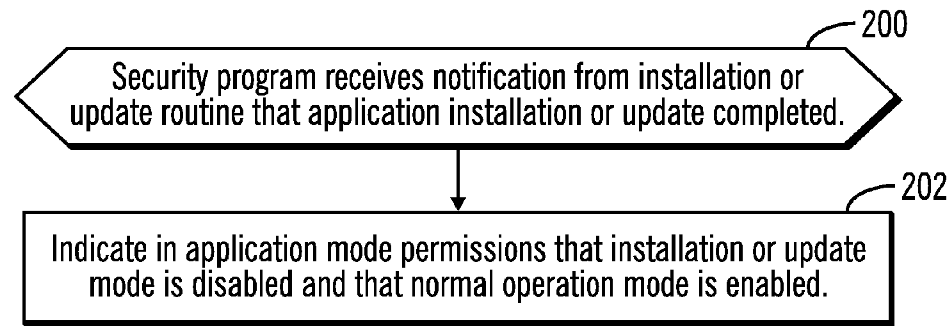
FIG. 6 illustrates an embodiment of operations to process a notification that an update or installation has completed.

FIG. 6 illustrates an embodiment of operations performed by the security program 20 when the installation or update has completed. In response to receiving (at block 200) notification from the installation 22 or update 36 routine that the installation or update, respectively, completed, the security program 20 indicates (at block 202) in the application the mode permissions 70 for the application 12 that installation 74 or update 78 mode is disabled and that normal operation mode 76 is enabled.

Figure 7:
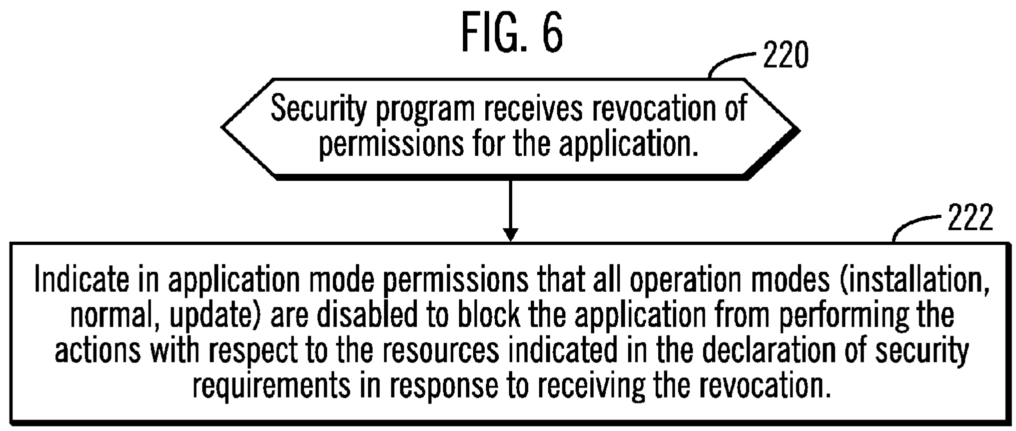
FIG. 7 illustrates an embodiment of operations to process a revocation of permissions for an application.

FIG. 7 illustrates an embodiment of operations performed by the security program 20 to process a revocation of permissions for an application 12. In response to receiving (at block 220) a revocation of permissions for the application 12 from a user or application, the security program 20 indicates (at block 222) in the application mode permissions 70 for the application 12 that all operation modes (e.g., installation 74, normal 76, update 78) are disabled to block the application from performing the actions with respect to the resources indicated in the declaration of security requirements in response to receiving the revocation.

Figure 8:
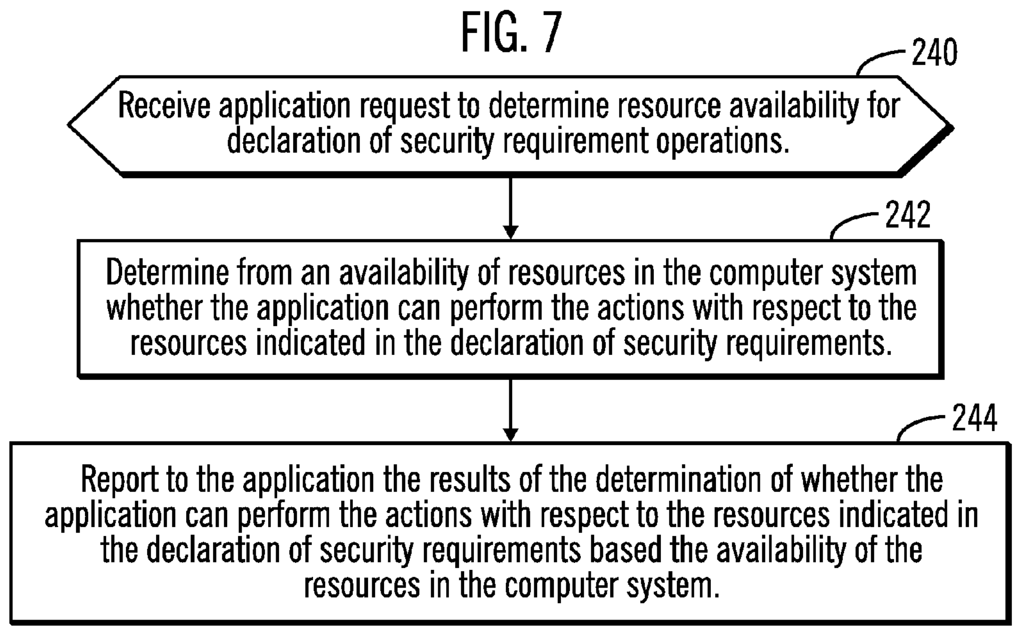
FIG. 8 illustrates an embodiment of operations to determine resource availability for a declaration of security requirements.

FIG. 8 illustrates an embodiment of operations performed by the security program 20 to generate a list indicating the availability of resources in the computer system 2 to service actions and requests in the declaration of security requirements 26. Upon receiving (at block 240) an application 12 request to determine the resource availability for declaration of security requirement operations 26, the security program 20 determines (at block 242) from an availability of resources in the computer system 2, whether the application can perform the actions with respect to the resources indicated in the declaration of security requirements 26. The security program 20 reports (at block 244) to the application 12 (or a user) the results of the determination of whether the application can perform the actions with respect to the resources indicated in the declaration of security requirements 26 for the application 12 based the availability of the resources in the computer system 2. The application 12 may request whether the computer system 12 has the resources to service the operations in the declaration 26 as part of the installation routine 22, during normal operations or as part of the update before applying the application update.

Figure 9:
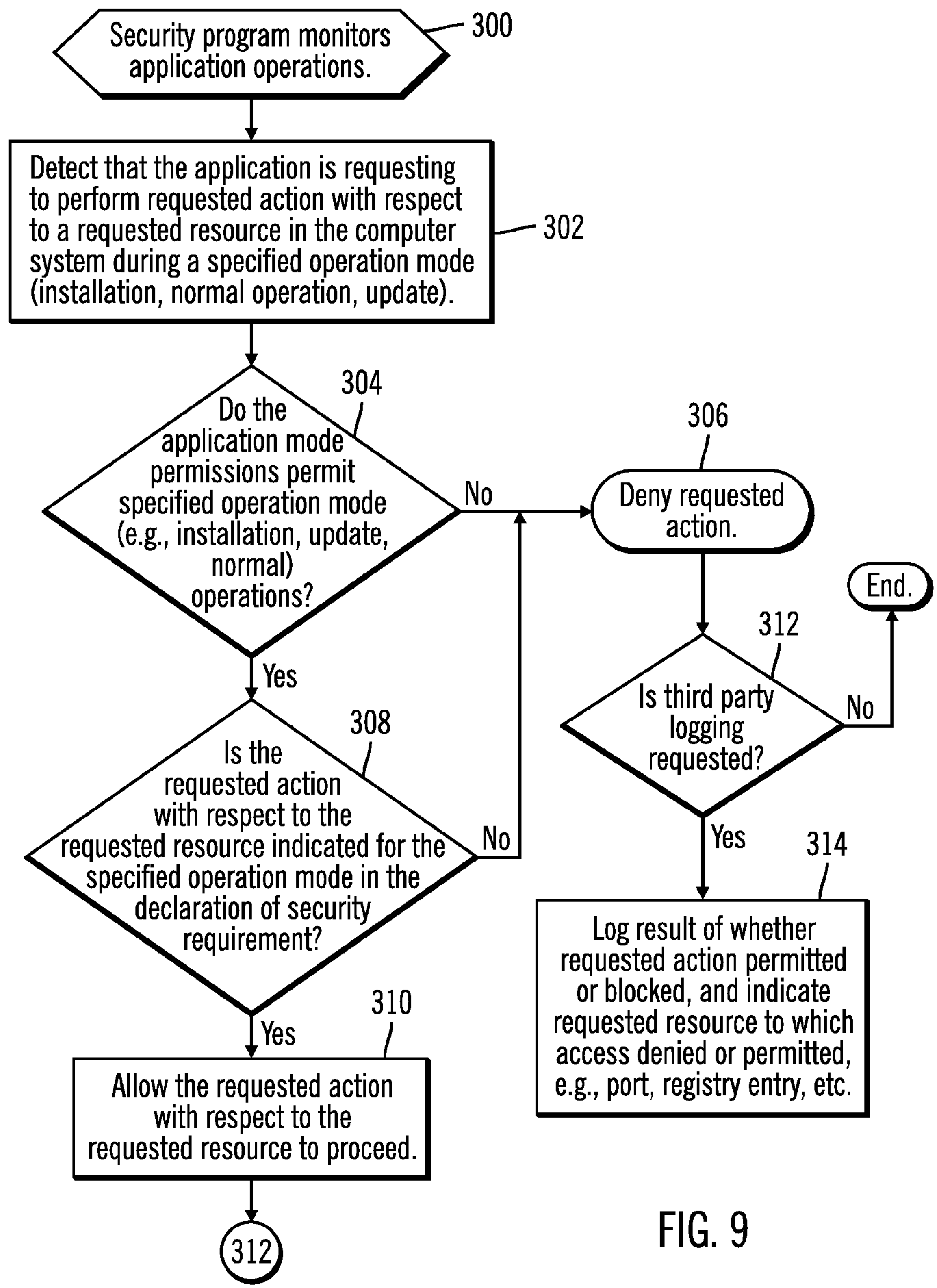
FIG. 9 illustrates an embodiment of operations to monitor application operations.

FIG. 9 illustrates an embodiment of operations for the security program 20 to monitor application 12 operations. When monitoring the application 12 (at block 300), the security program 20 detects (at block 302) that the application is requesting to perform a requested action with respect to a requested resource in the computer system 2 during a specified operation mode (e.g., installation, normal operation, update). If (at block 304) the application mode permissions 70 (FIG. 3) for the application 12 do not permit the specified operation mode (e.g., installation, update, normal) for which the operation is requested, e.g., the operation mode 74, 76, or 78 for which the action/resource is requested is disabled, then the requested action is denied (at block 306). Otherwise, if (at block 304) the specified mode is permitted, e.g., the operation mode 74, 76, 78 is enabled, then the security program 20 determines (at block 308) whether requested action with respect to the requested resource is indicated for the specified operation mode in the declaration of security requirements 26, e.g., whether the requested action and/or resource is specified in fields 54 of 56 for one entry 50 of the declaration of security requirements 26 for the application 12. If the declaration of security requirements 26 does not indicate that the action/resource is permitted for the specified operation mode, then the requested action is denied (at block 306). Denial of an action may be overridden if the user indicates to allow the action, thus overriding the declaration 26. Otherwise, if (at block 308) the requested action/resource for the operation mode is indicated in the declaration of security requirements 26, then the security program 26 allows (at block 310) the requested action with respect to a requested resource to proceed.

From blocks 306 or 310, if (at block 312) third party logging is requested, then the security program 20 logs the result of whether requested action is permitted or blocked indicate the requested resource to which access was denied or allowed, e.g., port, registry entry, etc., in the log. Further, the logged information may indicate the security requirement 50 in the declaration 26 that resulted in a requested action from being blocked. The third party reporting info 80 may indicate whether to log application 12 requested actions and the result of those requests. Further, the security program 20 may forward via email, text, etc., the results of the logging to a requested third party or the computer user. The computer user may specify a third party to receive the results of logging. The third party may or user may use the logged results to determine whether there are any problems with the declaration in not permitting or blocking certain actions. Further, the forwarded logged results may be used to assist the user in determining how to respond to requests by the security program 20 on whether certain actions should be allowed or blocked. The third party specified for being forwarded the log may comprise a trusted evaluator.

Figure 10:
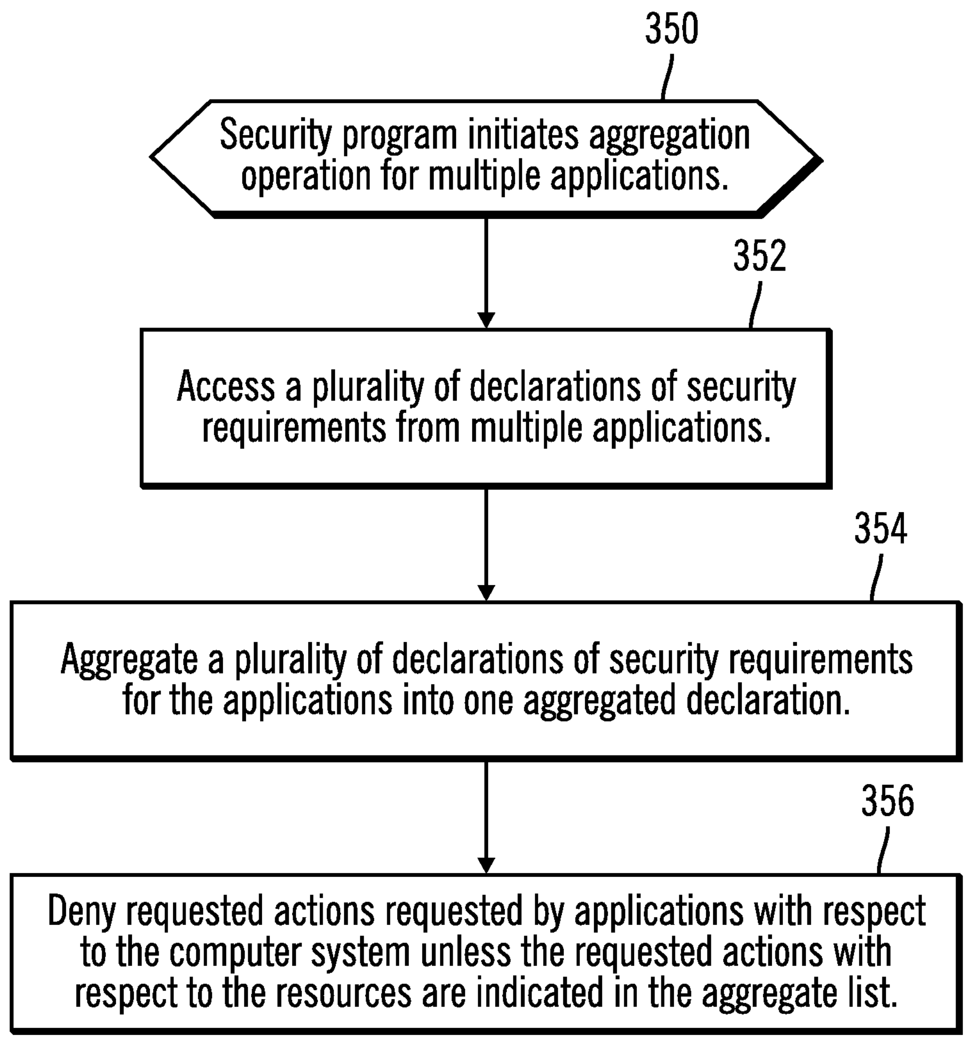
FIG. 10 illustrates an embodiment of operations to aggregate multiple declarations of security requirements.

FIG. 10 illustrates an embodiment of operations for the security program 20 to aggregate declarations of security requirements 26 for multiple applications 12. Upon initiating (at block 350) the aggregation procedure, the security program 20 accesses (at block 352) a plurality of declarations of security requirements 26 from multiple applications 12 and then aggregates (at block 354) the multiple declarations 26 into one aggregated declaration. The security program 20 would then deny (at block 356) requested actions requested by applications with respect to the computer system unless the requested actions with respect to the resources are permitted by the aggregate list.

Figure 11:
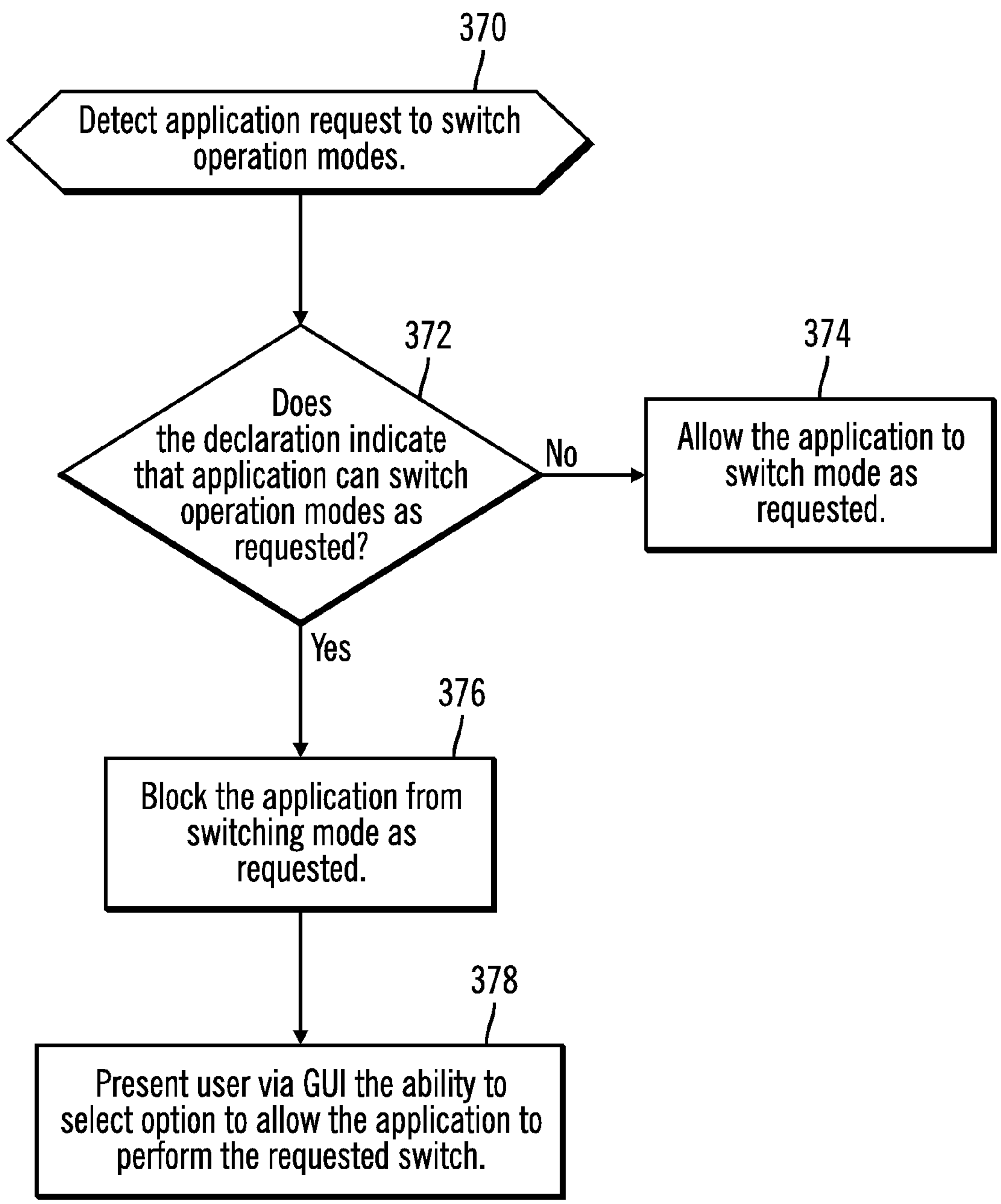
FIG. 11 illustrates an embodiment of operations to determine whether to allow an application to switch operation modes.

FIG. 11 illustrates an embodiment of operations for the security program 20 to determine whether to allow the application 12 to switch operating modes, like going from an install mode to normal operation mode or from normal operation to update mode and back again. Upon detecting (at block 370) that the application 12 is attempting or requesting to switch operation modes, the security program 20 determines whether the declaration of security requirements 26 permits the application to perform the specific switch. If so permitted, the security program 20 allows (at block 374) the application to switch the operation mode as requested. Otherwise, if (at block 372) the requested operation mode requested is not permitted, then that requested switch is blocked. As part of blocking the requested switch, the security program 20 may present (at block 378) the computer 2 user via the GUI the ability to select an option to allow the application to perform the requested switch.

Described embodiments provide concern an application interacting with a security program to provide the security program with a declaration of actions the application will perform, so that the security program may permit those authorized actions for operation modes indicated in the declaration. Actions not specified for operation modes by the declaration may be denied under the assumption that because they were not specified by the application developer, they may comprise unauthorized actions with malicious results.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4-11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 12:
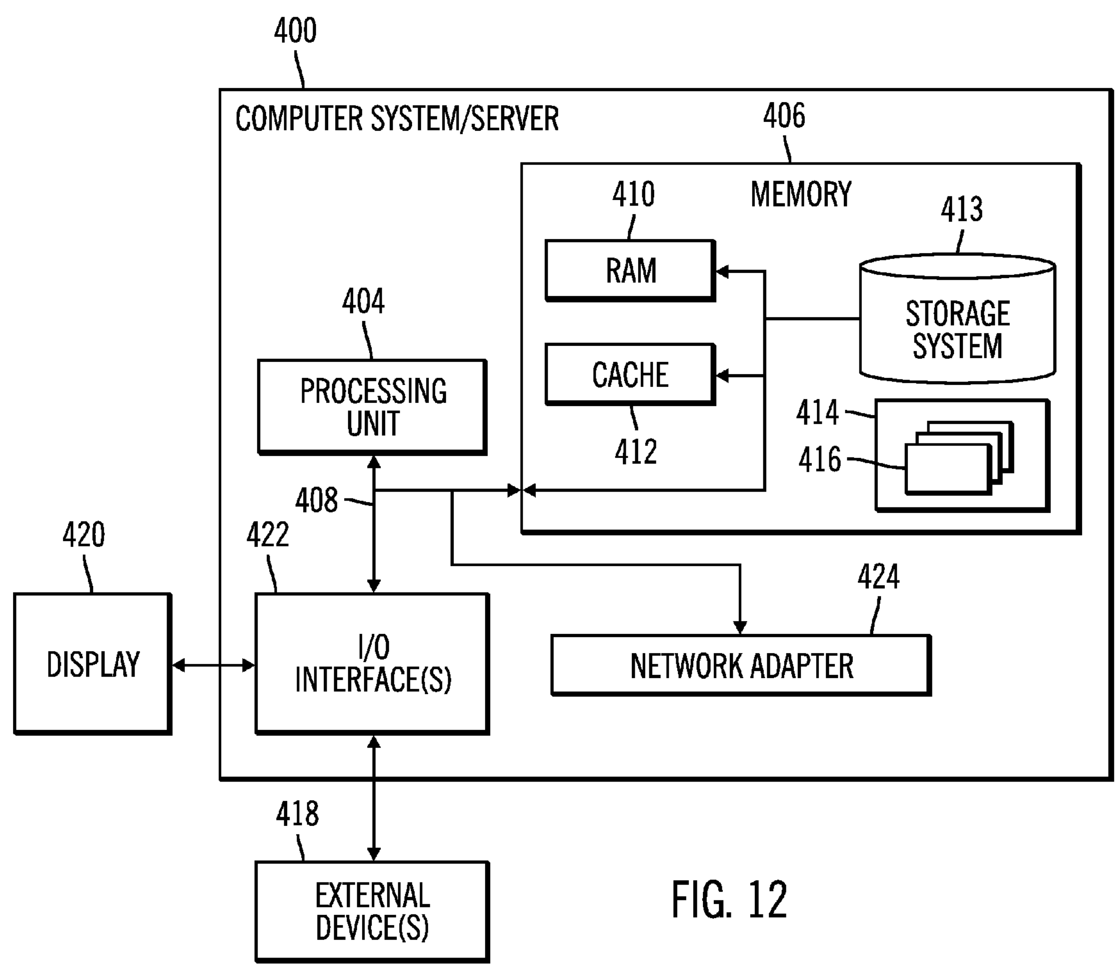
FIG. 12 illustrates an embodiment of a computer system.

FIG. 12 shows a computer system/server 400 in which the computers 2 and 30 shown in FIG. 1 may be implemented in the form of a general-purpose computing device. The components of computer system/server 400 may include, but are not limited to, one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 400 typically includes a variety of computer system readable media. Such media may be any available media that is accessible by computer system/server 400, and it includes both volatile and non-volatile media, removable and non-removable media.

System memory 406 can include computer system readable media in the form of volatile memory, such as random access memory (RAM) 410 and/or cache memory 412. Computer system/server 400 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

Computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 422. Still yet, computer system/server 400 can communicate with one or more networks such as a local area network (LAN), a general wide area network (WAN), and/or a public network (e.g., the Internet) via network adapter 424. As depicted, network adapter 424 communicates with the other components of computer system/server 400 via bus 408. It should be understood that although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for monitoring application operations of an application installed on a computer system, the computer program product comprising a computer readable storage device having computer readable program code embodied therein that executes to perform operations, the operations comprising:

receiving a declaration of security requirements indicating actions the application designates to perform with respect to resources in the computer system, wherein a plurality of the indicated actions are indicated for at least one of an installation mode and a normal operation mode, wherein the actions with respect to the resources indicated in the declaration of security requirements includes installation actions the application designates to perform in the installation mode and normal operation actions the application designates to perform in the normal operation mode;

performing during the installation mode operations comprising:

detecting that the application is requesting to perform a requested action with respect to a requested resource in the computer system;

determining whether the declaration of security requirements indicates the requested action with the installation mode; and allowing the requested action with respect to the requested resource to proceed in response to determining that the declaration of security requirements indicates the requested action with respect to the requested resource as indicated with the installation mode;

receiving notification that the installation mode has completed;

indicating the normal operation mode for the application in response to receiving indication that the installation mode completed to allow the normal operations actions to be performed by the application; and indicating that the installation actions indicated in the installation mode are not permitted in response to receiving the notification.

2. The computer program product of claim 1, wherein the resources indicated in the declaration of security requirements include indication of read and write operations to a registry file in the computer system, indication of communication ports in the computer system to access, indication of processes to invoke on the computer system, indication of read and write operations to files in a file system of the computer system, and indication of network address to access from the computer system.

3. The computer program product of claim 1, wherein the operations further comprise:

requesting a user to indicate via a graphical user interface whether to allow the application to perform the actions with respect to the resources indicated in the declaration of security requirements;

receiving a user response indicating whether to allow the application to perform the actions; and blocking the application from performing actions with respect to requested resources indicated in the declaration of security requirements in the computer system in response to the user response not allowing the application to perform the actions, wherein the operations of detecting that the application is requesting to perform the requested action, determining whether the declaration of security requirements indicates the requested action with respect to the requested response as indicated with the current operation mode, and allowing the requested action are performed in response to the user response allowing the application to perform the operations.

4. The computer program product of claim 1, wherein the normal operation mode:

detecting that the application is requesting to perform a requested action with respect to a requested resource in the computer system;

determining whether the requested action with respect to the requested resource is indicated with the normal operation mode in the declaration of security requirements; and allowing the requested action with respect to the requested resource to proceed in response to determining that the requested action with respect to the requested resource is indicated with the normal operation mode in the declaration of security requirements.

5. The computer program product of claim 4, wherein the declaration of security requirements further indicates update actions the application designates to perform in an update mode to update the application, wherein during the normal operation mode the operations further comprise:

receiving notification to commence the update mode; and indicating the update mode for the application in response to receiving the notification; and wherein during the update mode, performing operations comprising:

detecting that the application is requesting to perform an action with respect to a requested resource in the computer system;

determining whether the requested action with respect to the requested resource is associated with the update mode in the declaration of security requirements; and allowing the requested action with respect to the requested resource to proceed in response to determining that the requested action with respect to the requested resource is associated with the update mode in the declaration of security requirements.

6. The computer program product of claim 1, wherein the operations further comprise:

receiving a revocation of permissions for the application; and blocking the application from performing the actions with respect to the resources indicated in the declaration of security requirements in response to receiving the revocation.

7. The computer program product of claim 1, wherein the operations further comprise:

determining from an availability of resources in the computer system whether the application can perform the actions with respect to the resources indicated in the declaration of security requirements; and reporting to the application the results of the determination of whether the application can perform the actions with respect to the resources indicated in the declaration of security requirements based on the availability of the resources in the computer system.

8. The computer program product of claim 1, wherein the operations further comprise:

aggregating a plurality of declarations of security requirements for different applications indicating actions to perform for resources into an aggregate list of permitted actions with respect to the indicated resources for the applications; and denying requested actions requested by applications with respect to the computer system unless the requested actions with respect to the resources are indicated in the aggregate list.

9. The computer program product of claim 1, wherein the operations further comprise:

logging a result of allowing or blocking the application requested actions in a log file; and forwarding the log file to a network address indicated in user setting.

10. The computer program product of claim 1, wherein the operations further comprise:

receiving a request by the application to switch operation modes from the installation mode to the normal operation mode;

determining whether the declaration of security requirements permits the switch from the installation mode to the normal operation mode;

allowing the application to switch from the installation mode to the normal operation mode in response to determining that the declaration of security requirements permits the switch; and blocking the switch from the installation mode to the normal operation mode in response to determining that the declaration of security requirements permits the switch.

11. A system in which an application is installed, comprising:

a processor;

a computer readable storage medium having code executed by the processor to perform operations the operations comprising:

receiving a declaration of security requirements indicating actions the application designates to perform with respect to resources in the computer system, wherein a plurality of the indicated actions are indicated for at least one of an installation mode and a normal operation mode, wherein the actions with respect to the resources indicated in the declaration of security requirements includes installation actions the application designates to perform in the installation mode and normal operation actions the application designates to perform in the normal operation mode;

performing during the installation mode operations comprising:

detecting that the application is requesting to perform a requested action with respect to a requested resource in the computer system;

determining whether the declaration of security requirements indicates the request action with the installation mode; and allowing the requested action with respect to the requested resource to proceed in response to determining that the declaration of security requirements indicates the requested action with respect to the requested resource as indicated with the installation mode;

receiving notification that the installation mode has completed;

indicating the normal operation mode for the application in response to receiving indication that the installation mode completed to allow the normal operation actions to be performed by the application; and indicating that the installation actions indicated in the installation mode are not permitted in response to receiving the notification.

12. The system of claim 11, wherein during the normal operation mode:

detecting that the application is requesting to perform a requested action with respect to a requested resource in the computer system;

determining whether the requested action with respect to the requested resource is indicated with the normal operation mode in the declaration of security requirements; and allowing the requested action with respect to the requested resource to proceed in response to determining that the requested action with respect to the requested resource is indicated with the normal operation mode in the declaration of security requirements.

13. The system of claim 11, wherein the operations further comprise:

determining from an availability of resources in the computer system whether the application can perform the actions with respect to the resources indicated in the declaration of security requirements; and reporting to the application the results of the determination of whether the application can perform the actions with respect to the resources indicated in the declaration of security requirements based on the availability of the resources in the computer system.

14. The system of claim 11, the wherein the operations further comprise:

receiving a request by the application to switch operation modes from the installation mode to the normal operation mode;

determining whether the declaration of security requirements permits the switch from the installation mode to the normal operation mode;

allowing the application to switch from the installation mode to the normal operation mode in response to determining that the declaration of security requirements permits the switch; and blocking the switch from the installation mode to the normal operation mode in response to determining that the declaration of security requirements permits the switch.

15. A method for monitoring application operations of an application installed on a computer system, comprising:

receiving a declaration of security requirements indicating actions the application designates to perform with respect to resources in the computer system, wherein a plurality of the indicated actions are indicated for at least one of an installation mode and a normal operation mode, wherein the actions with respect to the resources indicated in the declaration of security requirements includes installation actions the application designates to perform in the installation mode and normal operation actions the application designates to perform in the normal operation mode;

performing during the installation mode operations comprising:

detecting that the application is requesting to perform a requested action with respect to a requested resource in the computer system;

detecting that the application is requesting to perform a requested action with respect to a requested resource in the computer system;

determining whether the declaration of security requirements indicates the requested action with the installation mode; and allowing the requested action with respect to the requested resource to proceed in response to determining that the declaration of security requirements indicates the requested action with respect to the requested resource as indicated with the installation mode;

receiving notifications that the installation mode has completed;

indicating the normal operation mode for the application in response to receiving indication that the installation mode completed to allow the normal operation actions to be performed by the application; and indicating that the installation actions indicated in the installation mode are not permitted in response to receiving the notification.

16. The method of claim 15, wherein during the normal operation mode:

detecting that the application is requesting to perform a requested action with respect to a requested resource in the computer system;

determining whether the requested action with respect to the requested resource is indicated with the normal operation mode in the declaration of security requirements; and allowing the requested action with respect to the requested resource to proceed in response to determining that the requested action with respect to the requested resource is indicated with the normal operation mode in the declaration of security requirements.

17. The method of claim 15, wherein the operations further comprise:

determining from an availability of resources in the computer system whether the application can perform the actions with respect to the resources indicated in the declaration of security requirements; and reporting to the application the results of the determination of whether the application can perform the actions with respect to the resources indicated in the declaration of security requirements based on the availability of the resources in the computer system.

18. The method of claim 15, wherein the operations further comprise:

receiving a request by the application to switch operation modes from the installation mode to the normal operation mode;

determining whether the declaration of security requirements permits the switch from the installation mode to the normal operation mode;

allowing the application to switch from the installation mode to the normal operation mode in response to determining that the declaration of security requirements permits the switch; and blocking the switch from the installation mode to the normal operation mode in response to determining that the declaration of security requirements permits the switch.

* * * * *